(12) United States Patent
Iwamizu

(10) Patent No.: US 9,438,032 B2
(45) Date of Patent: Sep. 6, 2016

(54) SEMICONDUCTOR DEVICE

(71) Applicant: FUJI ELECTRIC CO., LTD., Kawasaki-shi (JP)

(72) Inventor: Morio Iwamizu, Matsumoto (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 149 days.

(21) Appl. No.: 14/470,223

(22) Filed: Aug. 27, 2014

(65) Prior Publication Data
US 2015/0109706 A1 Apr. 23, 2015

(30) Foreign Application Priority Data

Oct. 17, 2013 (JP) .................................. 2013-216234

(51) Int. Cl.
*H02H 9/02* (2006.01)
*H02H 7/20* (2006.01)
*H02H 11/00* (2006.01)

(52) U.S. Cl.
CPC ............. *H02H 9/025* (2013.01); *H02H 7/205* (2013.01); *H02H 11/002* (2013.01)

(58) Field of Classification Search
CPC ..... H02H 9/025; H02H 11/002; H02H 7/205
USPC .......................................................... 361/84
See application file for complete search history.

(56) References Cited

U.S. PATENT DOCUMENTS

| 7,283,343 | B2* | 10/2007 | Grose ................. | H02H 11/002 361/84 |
| 8,116,051 | B2* | 2/2012 | Nakahara ......... | H03K 17/08122 361/84 |
| 2004/0263132 | A1 | 12/2004 | Fukami | |
| 2010/0118459 | A1* | 5/2010 | Logiudice ............ | H02H 11/003 361/84 |

FOREIGN PATENT DOCUMENTS

JP 2005-019532 A 1/2005

* cited by examiner

*Primary Examiner* — Scott Bauer
(74) *Attorney, Agent, or Firm* — Rossi, Kimms & McDowell LLP

(57) ABSTRACT

The semiconductor device includes a power chip including a switching element that switches a supply of power from a power supply to a load between an on-state and an off-state, a control chip in which is incorporated a control circuit that controls the switching element of the power chip, and a reverse connection protection circuit, provided in the control chip, that controls the switching element of the power chip into an on-state when the power supply is reverse-connected, wherein the reverse connection protection circuit has protective resistors, interposed between the control circuit and the positive electrode side of the power supply, and a control voltage formation circuit into which is input an intermediate voltage of the protective resistors and which forms a control voltage that controls the switching element of the power chip into an on-state when the power supply is reverse-connected.

6 Claims, 6 Drawing Sheets

US 9,438,032 B2

SEMICONDUCTOR DEVICE

CROSS-REFERENCE TO RELATED APPLICATIONS

This application is based on, and claims priority to, Japanese Patent Application No. 2013-216234, filed on Oct. 17, 2013, the contents of which are incorporated herein by reference.

BACKGROUND OF THE INVENTION

1. Field of the Invention

The present invention relates to a semiconductor device applied to a load drive circuit having a configuration wherein a switching element is interposed between a positive electrode of a power supply and a load, and in particular, relates to a semiconductor device such that the switching element is a protected in a state wherein the power supply is connected in a reverse orientation.

2. Description of Related Art

A vehicle power supply circuit device described in, for example, JP-A-2005-19532 has been proposed as this kind of semiconductor device. This heretofore known example includes a power chip 101 that switches a current supply from a vehicle-mounted power supply 103 to a load 104 between an on-state and an off-state, as shown in FIG. 7 and FIG. 8. The heretofore known example has an internal circuit 105 that controls the switching on and off of the power chip 101, and includes a control chip 102 configured separately from the power chip 101. A vehicle power supply control device 110 such that control of the power supply to the load 104 is possible is configured by the power chip 101 being controlled by the internal circuit 105 in a state wherein the power chip 101 and control chip 102 are connected in parallel with the vehicle-mounted power supply 103. Further, the control chip 102 includes a depression type MOSFET 107, wherein a source terminal 171 is connected to a power supply terminal 121 or a ground terminal 122 of the control chip 102, while a drain terminal 172 is connected to the internal circuit 105.

Further, the heretofore known example described in JP-A-2005-19532 is such that the depression type MOSFET 107 is connected to the vehicle-mounted power supply 103 positive electrode side of the control chip 102, the depression type MOSFET 107 functions as a constant current element when the vehicle-mounted power supply 103 is reverse-connected, voltage necessary for causing a current of the same value as the constant current flowing through the depression type MOSFET 107 to flow is applied to the internal circuit 105, and the remaining voltage is applied to the depression type MOSFET 107.

When the vehicle-mounted power supply 103 is forward-connected, the voltage drop is small owing to a low resistance region, which is a characteristic of the depression type MOSFET 107, being used. However, the heretofore known example is such that it is essential to connect a depression type MOSFET to the control chip 102, an additional manufacturing step is necessary in order to integrate a normal MOSFET that is not of a depression type and a depression type MOSFET, and there is an unresolved problem in that the number of man-hours increases, and cost increases due to a drop in yield.

Also, as no circuit generating a signal to be supplied to the gate of the power chip is shown in the internal circuit 105, there is also an unresolved problem in that trouble such as a transistor in the internal circuit 105 that should by rights be turned on when the vehicle-mounted power supply 103 is reverse-connected being turned off, and the output of an OUT terminal 125 being of high impedance, may occur. Because of this, there is an unresolved problem in that it is necessary to specify a circuit that guarantees problem-free operation even when a vehicle-mounted power supply is reverse-connected.

SUMMARY OF THE INVENTION

Therefore, the invention, having been contrived focusing on the unresolved problems of the heretofore known example, has an object of providing a semiconductor device such that it is possible to suppress current flowing through a control chip, without using a depression type MOSFET, when a power supply is reverse-connected, and to reliably switch a switching element of a power chip into an on-state, thus suppressing heat generation.

In order to achieve the heretofore described object, one aspect of a semiconductor device according to the invention includes a power chip including a switching element that switches a supply of power from a power supply to a load between an on-state and an off-state, a control chip in which is incorporated a control circuit that controls the switching element of the power chip, and a reverse connection protection circuit, provided in the control chip, that controls the switching element of the power chip into an on-state when the power supply is reverse-connected, wherein the reverse connection protection circuit has protective resistors, interposed between the control circuit and the positive electrode side of the power supply, and a control voltage formation circuit into which is input an intermediate voltage of the protective resistors and which forms a control voltage that controls the switching element of the power chip into an on-state when the power supply is reverse-connected.

Also, one aspect of the semiconductor device according to the invention is such that the protective resistors are of a configuration wherein the control circuit side is connected to the control chip substrate, and a substrate potential is provided.

Also, one aspect of the semiconductor device according to the invention is such that the control voltage formation circuit is such that the intermediate voltage of the voltage divider resistors is supplied to the gate terminal, and includes a voltage control semiconductor element into the input side terminal of which is input the substrate potential formed by the protective resistors.

Also, one aspect of the semiconductor device according to the invention is such that the control voltage formation circuit is of a configuration wherein a reverse blocking diode is connected in series with the voltage control semiconductor element.

Also, one aspect of the semiconductor device according to the invention is such that the control voltage formation circuit is of a configuration wherein a second voltage control semiconductor element of a channel differing from that of the voltage control semiconductor element is connected in series with the voltage control semiconductor element.

Also, one aspect of the semiconductor device according to the invention is such that the second voltage control semiconductor element is of a configuration wherein the gate terminal and input side terminal are short-circuited, and the back gate terminal is connected to the output terminal side of a third voltage control semiconductor element whose switching is controlled by a control signal.

Also, one aspect of the semiconductor device according to the invention is such that the reverse connection protection circuit is configured to have a charge pump circuit into which is input control voltage output from the voltage control semiconductor element of the control voltage formation circuit, and the output of the charge pump circuit is supplied to the power chip.

According to the invention, it is possible to supply a control voltage sufficient for switching the switching element of the power chip to an on-state while suppressing heat generation in the control chip by suppressing current flowing through the control chip, without connecting a depression type MOSFET to the control chip, when the power supply is reverse-connected, and thus possible to reliably switch the switching element of the power chip to an on-state, suppressing heat generation in the power chip.

DETAILED DESCRIPTION OF THE INVENTION

Hereafter, in association with the drawings, a description will be given of embodiments of the invention.

Figure 1:
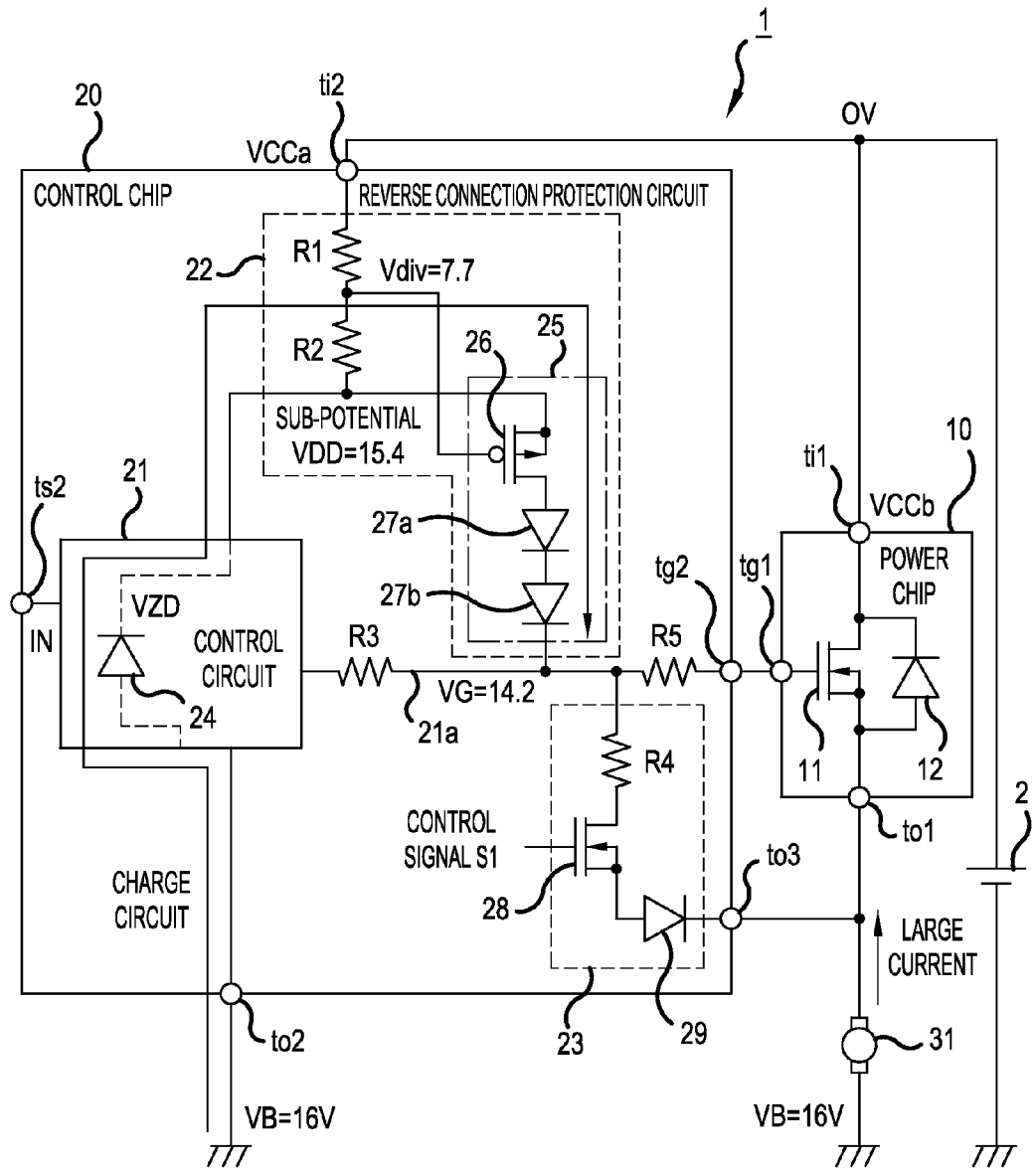
FIG. 1 is a circuit diagram showing a specific configuration of a semiconductor device showing a first embodiment of the invention.
Figure 2:
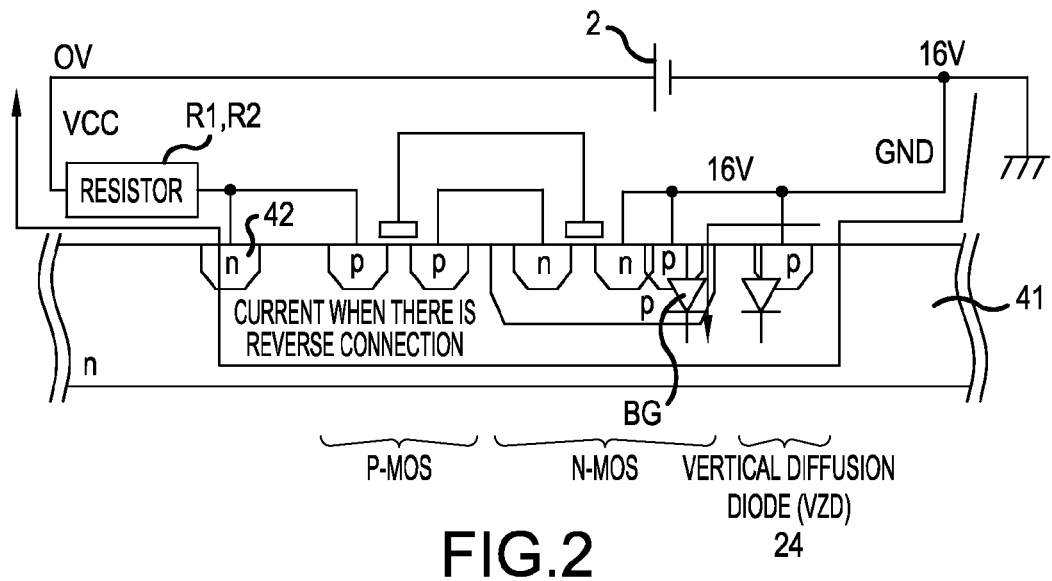
FIG. 2 is a sectional view showing an element structure of the semiconductor device of FIG. 1.

FIG. 1 is a circuit diagram showing a configuration of a semiconductor device showing a first embodiment of the invention, while FIG. 2 is a sectional view showing an element structure of the semiconductor device of FIG. 1.

In FIG. 1, reference sign 1 is a motor drive circuit, and the motor drive circuit 1 has a direct current power supply 2 such as a vehicle-mounted battery. The negative electrode side of the direct current power supply 2 is grounded, while the positive electrode side is connected to a power chip 10 and a control chip 20.

The power chip 10 includes an n-channel MOSFET 11 acting as a switching element, wherein the drain of the MOSFET 11 is connected to an input terminal ti1 connected to the positive electrode side of the direct current power supply 2. Also, the source of the MOSFET 11 is connected to an output terminal to1 connected to the other end of an electric motor 31, acting as a load, of which one end is grounded. Furthermore, the gate of the MOSFET 11 is connected to a gate signal input terminal tg1. Reference sign 12 is a parasitic diode.

The control chip 20 includes an input terminal ti2 connected to the positive electrode side of the direct current power supply 2, an output terminal to2 connected to the ground, a drive control signal input terminal ts2 into which a drive control signal is input, a gate signal output terminal tg2 that outputs a gate signal to the power chip 10, and an output terminal to3 connected to a connection point of the power chip 10 and the electric motor 31.

Also, the control chip 20 includes a control circuit 21 that forms a gate voltage VG that controls the on-state and off-state of the MOSFET 11 of the power chip 10, a reverse connection protection circuit 22 that protects the power chip 10 and control chip 20 when the direct current power supply 2 is reverse-connected, and a gate signal formation circuit 23 that forms a gate signal to be supplied to the MOSFET 11 of the power chip 10.

The control circuit 21 includes an electrostatic discharge (ESD) protection vertical diffusion diode 24 configured in a p-channel region formed on the upper surface side of an n-type substrate 41, as shown in FIG. 2, wherein the anode of the vertical diffusion diode 24 is connected to the output terminal to2, while the cathode is connected to the reverse connection protection circuit 22 in the n-type substrate 41. Also, P-MOS and N-MOS shown in FIG. 2 indicate one common pair of a p-channel MOSFET and an n-channel MOSFET, representing the control circuit 21, used when the control circuit 21 is formed of a CMOS.

The reverse connection protection circuit 22 includes voltage divider resistors R1 and R2 as protective resistors connected between the input terminal ti2 and the cathode of the vertical diffusion diode 24, and a control voltage formation circuit 25. Of the reverse connection protection circuit 22, only resistance representing the series circuit of the resistors R1 and R2 is shown in FIG. 2, while the other portion of the reverse connection protection circuit 22 (the portion corresponding to the control voltage formation circuit 25) is omitted from the drawing.

The control voltage formation circuit 25 includes a p-channel MOSFET 26, into whose gate terminal is input an intermediate voltage Vdiv output from an intermediate connection point of the voltage divider resistors R1 and R2, and two reverse blocking diodes 27a and 27b interposed between the drain of the p-channel MOSFET 26 and a connection point of a resistor R3 and a resistor R5 of a gate voltage line 21a connected to an output terminal of the control circuit 21. The source of the p-channel MOSFET 26 is connected to a connection point of the voltage divider resistor R2 and the cathode of the vertical diffusion diode 24.

The gate signal formation circuit 23 includes a resistor R4, one end of which is connected to a connection point of the resistors R3 and R5 of the gate voltage line 21a connected to the output terminal of the control circuit 21, an n-channel MOSFET 28, whose drain is connected to the other end of the resistor R4, and a reverse blocking diode 29, whose anode is connected to the source of the n-channel MOSFET 28 while the cathode is connected to the output terminal to3.

The gate signal formation circuit 23 is such that, when a control signal S1 supplied to the gate of the n-channel MOSFET 28 is at a low level, the n-channel MOSFET 28 switches to an off-state and, by the gate voltage of the gate voltage line 21a being applied via the resistor R5 to the gate of the n-channel MOSFET 11 of the power chip 10, the n-channel MOSFET 11 is controlled into an on-state.

Conversely, by a high level control signal S1 being supplied to the gate of the n-channel MOSFET 28, the n-channel MOSFET 28 switches to an on-state, the gate voltage of the gate voltage line 21a is pulled down, and the n-channel MOSFET 11 of the power chip 10 is controlled into an off-state. Also, by a charge pump circuit inside the control circuit 21 being deactivated at this time, it is possible to reliably control the n-channel MOSFET 11 of the power chip 10 into an off-state.

Apart from the heretofore described configuration, the motor drive circuit 1 may also include an overheat detector circuit, an overcurrent detector circuit, a load short circuit detector circuit, and the like, although these are not shown in the drawings, and the motor drive circuit 1 also has a charge pump circuit that generates voltage supplied to the high side circuit, and the like, although this is not shown in the drawings.

Next, a description will be given of an operation of the first embodiment. Herein, owing to the control signal S1 supplied to the n-channel MOSFET 28 of the gate signal formation circuit 23 of the control chip 20 being at a low level when the direct current power supply 2 is connected in a forward direction, as shown in FIG. 1, the gate voltage VG output from the control circuit 21 is applied to the gate of the n-channel MOSFET 11 of the power chip 10, the n-channel MOSFET 11 switches to an on-state as appropriate, and a power supply voltage VB of the direct current power supply 2 is supplied via the n-channel MOSFET 11 to the electric motor 31, whereby the electric motor 31 is rotationally driven. In this case, as the voltage of the inverting gate terminal (as the p-channel MOSFET 26 is turned on when the voltage input into the gate terminal of the p-channel MOSFET 26 is at a low level, the gate terminal is called an inverting gate terminal) of the p-channel MOSFET 26 is pulled up, the p-channel MOSFET 26 is in an off-state.

By the control signal S1 supplied to the n-channel MOSFET 28 of the gate signal formation circuit 23 being changed to a high level in a state in which the electric motor 31 is being rotationally driven, the gate voltage VG of the gate voltage line 21a is pulled down, and the n-channel MOSFET 11 of the power chip 10 switches to an off-state, whereby the supply of direct current power supply to the electric motor 31 is interrupted.

Next, a description will be given of a case in which a reverse connection state, wherein the negative electrode side of the direct current power supply 2 is connected to the input terminal ti1 of the power chip 10 and the input terminal ti2 of the control chip 20 while the positive electrode side is grounded, is adopted when connecting the direct current power supply 2 to the motor drive circuit 1.

When the direct current power supply 2 is in this reverse-connected state, the direct current power supply, which is the power supply voltage VB (for example, 16V), is input into the output terminal to2 of the control chip 20, and the direct current power supply is input via the electric motor 31 into the output terminal to1 of the power chip 10, as shown by the thick arrows in FIG. 1.

As current flows through the parasitic body diode 12 and vertical diffusion diode 24 in the power chip 10 and control chip 20, it is not normally possible to control this current. As the parasitic body diode 12 and vertical diffusion diode 24 are not provided with the assumption that they will be constantly conductive, a problem of thermal destruction due to heat generation or overheat occurs when current is continuously caused to flow through the parasitic body diode 12 and the vertical diffusion diode 24.

In this embodiment, however, the reverse connection protection circuit 22 is interposed between the vertical diffusion diode 24 of the control chip 20 and the input terminal ti2. The voltage divider resistors R1 and R2 are connected between the cathode of the vertical diffusion diode 24 and the input terminal ti2 in the reverse connection protection circuit 22. Because of this, the current path of the control chip 20 is such that, to describe using FIG. 2 showing the element structure, current supplied from the reverse-connected direct current power supply 2 flows into the n-type substrate 41 through the vertical diffusion diode 24 and a diode BG configured of the back gate of the N-MOS and the n-type substrate 41, and flows into the voltage divider resistors R1 and R2 through a high concentration n-type region 42 in the drawing. Consequently, it is possible to control the current flowing through the control chip 20 using the voltage divider resistors R1 and R2, and thus possible to suppress heat generation when the control chip power supply is reverse-connected.

Regarding the potential of each portion of the control chip 20 at this time, the potential is the power supply voltage VB (=16V) of the direct current power supply 2 at the output terminal to2, as shown in FIG. 1, and assuming a forward voltage Vf of the p-n junction of the n-type substrate 41 to be 0.6V for the sake of simplicity, a substrate potential (sub-potential) VDD that has passed through the vertical diffusion diode 24 is such that VDD=VB−Vf=15.4V.

Further, when the resistance value of the voltage divider resistors R1 and R2 is, for example, 100Ω, an intermediate voltage Vdiv output from a connection point of the voltage divider resistors R1 and R2 is such that Vdiv=VDD×(½) =7.7V, which is half of the substrate potential VDD. As the intermediate voltage Vdiv is supplied to the inverting gate terminal of the p-channel MOSFET 26, the p-channel MOSFET 26 switches to an on-state. Because of this, current flows to the gate voltage line 21a through the p-channel MOSFET 26 and reverse blocking diodes 27a and 27b.

At this time, when on-state resistance Ron of the p-channel MOSFET 26 is sufficiently low, and the resistance values of the resistor R3 interposed in the gate voltage line 21a and resistor R4 of the gate signal formation circuit 23 are sufficiently high, the gate voltage VG of the gate voltage line 21a is such that VG=VB−3Vf=14.2V, and by the gate voltage VG being applied to the gate of the n-channel MOSFET 11 of the power chip 10, the n-channel MOSFET 11 is reliably controlled into an on-state. Because of this, it is possible to suppress heat generation in the power chip 10.

In a heretofore known current path, various impedances exist in the n-channel MOSFET 28 and control circuit 21, but by setting so that the p-channel MOSFET 26 and reverse blocking diodes 27a and 27b form sufficiently low impedance with respect to the resistors R3 and R4, simplification of design is possible.

Herein, the reverse blocking diodes 27a and 27b are for preventing a reverse flow of charged up gate potential to the p-channel MOSFET 26 at a time of normal operation. In this embodiment, as the n-channel MOSFET 11 is being used in high side configuration, the gate of the power chip is controlled with a voltage boosted to the power supply voltage or higher by a charge pump circuit, or the like, in order to completely switch the n-channel MOSFET 11 of the power chip 10 to an on-state at a time of normal operation.

Because of this, the reverse blocking diodes 27a and 27b are disposed in order to prevent a reverse flow of boosted voltage to the substrate voltage VDD or the like. Therefore, when the breakdown voltage of the reverse blocking diodes 27a and 27b is sufficiently high with respect to the boosted voltage, the reverse blocking diode can be of a one stage configuration. In this case, the gate voltage VG when there is reverse connection is approximately such that VG=VB−2Vf.

Figure 3:
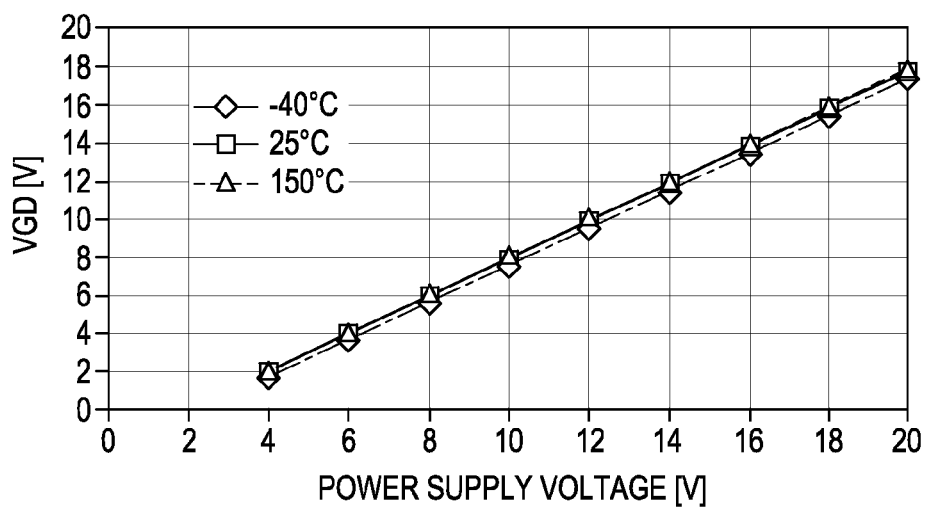
FIG. 3 is a characteristic line drawing showing an example of voltage applied to a power chip when a power supply is reverse-connected in the first embodiment.

FIG. 3 shows the results of a simulation of power supply voltage and the corresponding gate voltage VGD when there is reverse connection in this embodiment. As is also clear from FIG. 3, it is found that a gate voltage such that VGD=VB−3×Vf is applied to the n-channel MOSFET 11 of the power chip 10.

When the power supply current (consumption current) of the control circuit 21 is 1 mA at a time of normal operation, the voltage drop when the resistance value of the voltage divider resistors R1 and R2 is 200Ω, is in the region of 0.2V, which is no problem for normal operation. Also, the gate voltage of the p-channel MOSFET 26 is 0.1V higher than the source voltage of the p-channel MOSFET 26. Therefore, it does not happen that the p-channel MOSFET 26 is in an on-state at a time of normal operation. Also, as it is only when the power supply is reverse-connected that a large direct current like voltage is applied to the voltage divider resistors R1 and R2, various controls are possible with the intermediate voltage Vdiv thereof.

Figure 4:
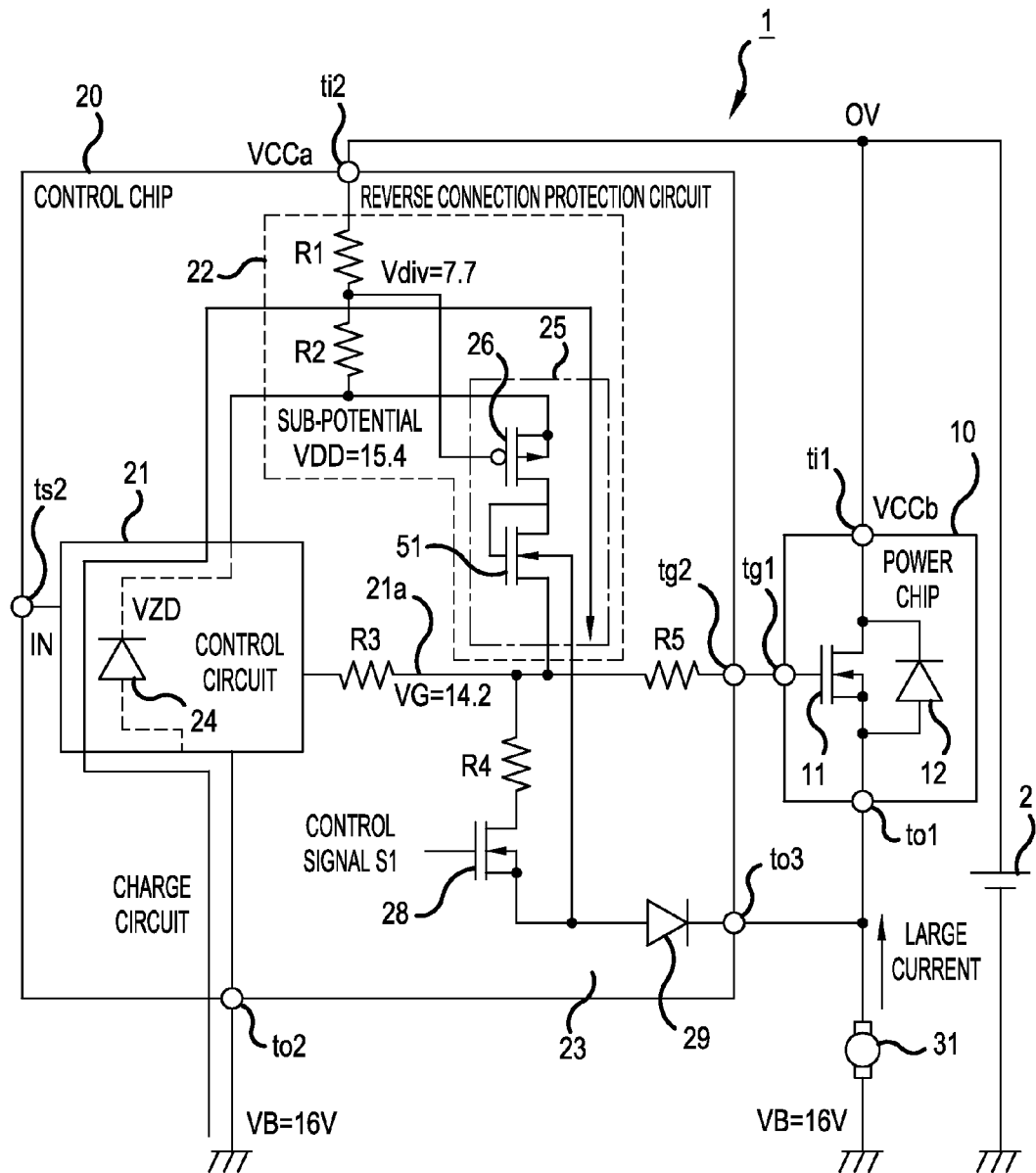
FIG. 4 is a circuit diagram showing a specific configuration of a semiconductor device showing a second embodiment of the invention.

Next, based on FIG. 4, a description will be given of a second embodiment of the invention.

In the second embodiment, the reverse blocking diodes 27a and 27b of the reverse connection protection circuit 22 are omitted, and an n-channel MOSFET 51 is connected instead.

In the second embodiment, by the gate terminal and drain terminal of the n-channel MOSFET 51 being short-circuited and the back gate terminal being connected to a connection point of the n-channel MOSFET 28 of the gate signal formation circuit 23 and the reverse blocking diode 29, the n-channel MOSFET 51 is used for reverse blocking.

In the second embodiment too, as the reverse blocking diodes 27a and 27b of the reverse connection protection circuit 22 are simply replaced with the n-channel MOSFET 51, the same operational advantages as in the first embodiment can be obtained.

Figure 5:
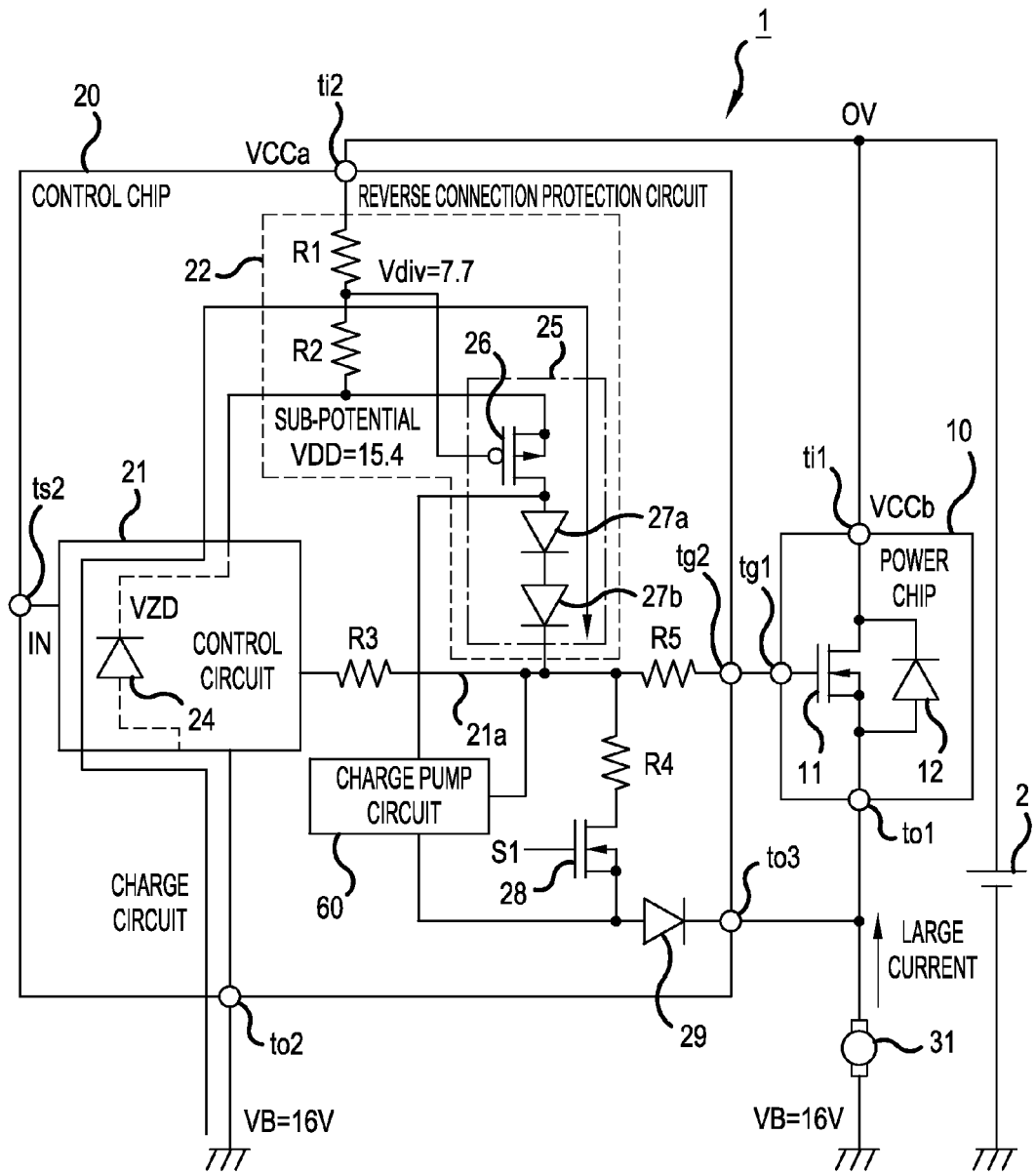
FIG. 5 is a circuit diagram showing a specific configuration of a semiconductor device showing a third embodiment of the invention.

Next, based on FIG. 5, a description will be given of a third embodiment of the invention.

In the third embodiment, the first embodiment is such that, by a connection point of the p-channel MOSFET 26 and reverse blocking diode 27a of the reverse connection protection circuit 22 being connected to a charge pump circuit 60, and the output of the charge pump circuit 60 being connected to the gate voltage line 21a, the gate voltage VG can also be boosted when the direct current power supply 2 is reverse-connected. By so doing, it is possible to prevent the drop in the gate voltage VGD at a low power supply voltage shown in FIG. 3.

The charge pump circuit 60 is of a circuit configuration that operates only when the direct current power supply 2 is reverse-connected. Because of this, it is possible to easily fabricate a detector circuit or the like that, by using in the same way, operates only when the direct current power supply 2 is reverse-connected.

Figure 6:
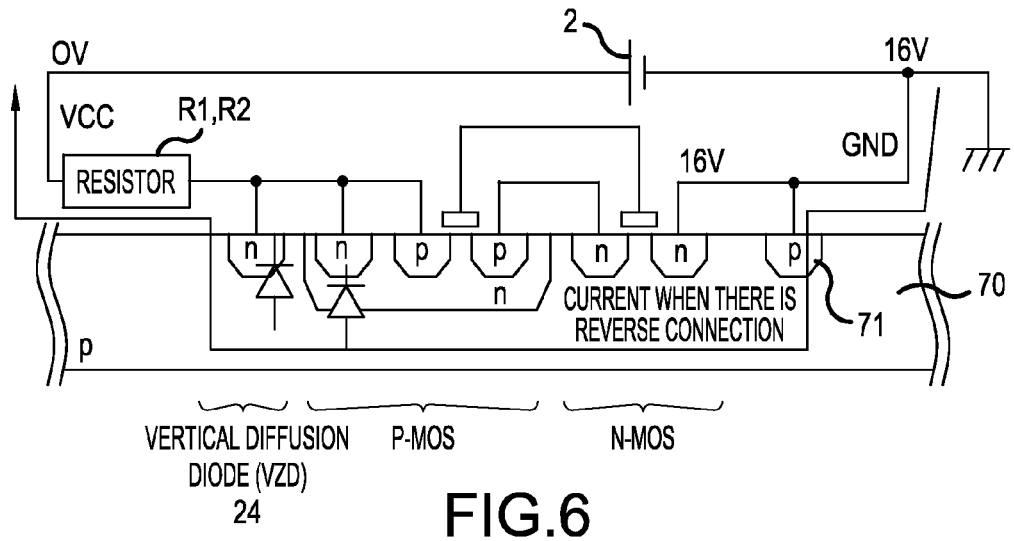
FIG. 6 is a sectional view showing an element structure of a semiconductor device showing a fourth embodiment of the invention.
Figure 7:
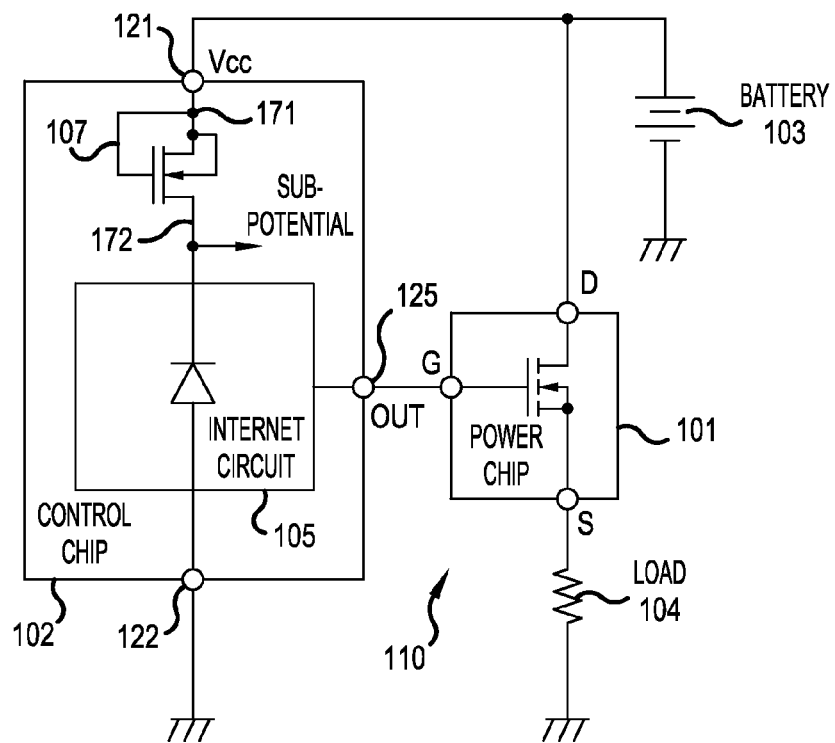
FIG. 7 is a circuit diagram showing a heretofore known example.
Figure 8:
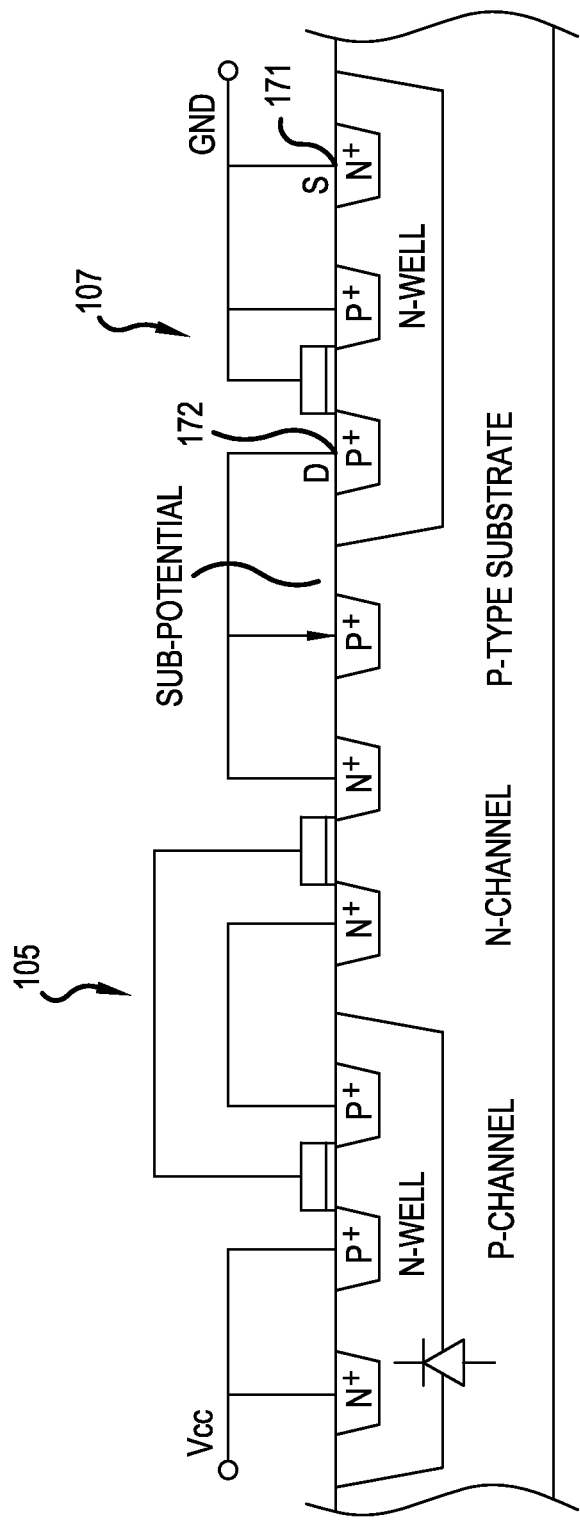
FIG. 8 is a sectional view showing an element structure of the semiconductor device of FIG. 7.

In the first to third embodiments, a description has been given of a case wherein the control chip 20 is configured of the n-type substrate 41 but, this not being limiting, it is also possible to apply a p-type substrate 70, as shown in FIG. 6. In this case, a high concentration p-type region 71 to which current is supplied when the direct current power supply 2 is reverse-connected is formed on, for example, the right side of the p-type substrate 70, and the control circuit 21 (in FIG. 6, the control circuit 21 is shown represented by one common pair of a P-MOS (p-channel MOSFET) and an N-MOS (n-channel MOSFET) used when the control circuit 21 is formed of a CMOS) and vertical diffusion diode 24 are formed sequentially on the left side of the high concentration p-type region 71. Further, when the direct current power supply 2 is reverse-connected, current is caused to flow to the resistors R1 and R2 along a path of the high concentration p-type region 71, p-type substrate 70, and vertical diffusion diode 24 (VZD). Other configurations and operations are the same as in the heretofore described embodiments.

Also, there being no need to set the resistance values of the voltage divider resistors R1 and R2 to be the same, it is possible to set arbitrary values provided that it is possible to switch the p-channel MOSFET 26 to an on-state.

Also, in the first to third embodiments, a description has been given of a case wherein the switching element of the power chip 10 is configured of a MOSFET, but it is possible to apply another voltage controlling semiconductor element, such as an IGBT.

Also, in the first to third embodiments, a description has been given of a case wherein the electric motor 31 is applied as the load but, this not being limiting, it is possible to apply a load of another arbitrary configuration, such as a lamp.

What is claimed is:

1. A semiconductor device, comprising:
    a power chip including a switching element that switches a supply of power from a power supply to a load between an on-state and an off-state;
    a control chip in which is incorporated a control circuit that controls the switching element of the power chip; and
    a reverse connection protection circuit, provided in the control chip, that controls the switching element of the power chip into an on-state when the power supply is reverse-connected, wherein
    the reverse connection protection circuit has protective resistors, interposed between the control circuit and the positive electrode side of the power supply, and a control voltage formation circuit into which is input an intermediate voltage of the protective resistors and which forms a control voltage that controls the switching element of the power chip into an on-state when the power supply is reverse-connected, and
    the protective resistors are of a configuration wherein the control circuit side is connected to the control chip substrate, and a substrate potential is provided.

2. The semiconductor device according to claim 1, wherein the control voltage formation circuit having a voltage control semiconductor element into the input side terminal of which is the substrate potential formed by the protective resistors, and intermediate voltage of the voltage divider resistors is supplied to the gate terminal of the voltage control semiconductor element.

3. The semiconductor device according to claim 2, wherein the control voltage formation circuit is such that a reverse blocking diode is connected in series with the voltage control semiconductor element.

4. The semiconductor device according to claim 2, wherein the control voltage formation circuit is such that a second voltage control semiconductor element of a channel differing from that of the voltage control semiconductor element is connected in series with the voltage control semiconductor element.

5. The semiconductor device according to claim 4, wherein the second voltage control semiconductor element is such that the gate terminal and input side terminal are short-circuited, and the back gate terminal is connected to the output terminal side of a third voltage control semiconductor element whose switching is controlled by a control signal.

6. The semiconductor device according to claim 2, wherein the reverse connection protection circuit has a charge pump circuit into which is input control voltage output from the voltage control semiconductor element of the control voltage formation circuit, and the output of the charge pump circuit is supplied to the power chip.

* * * * *